United States Patent Office 3,450,792
Patented June 17, 1969

3,450,792
HEAT-HARDENABLE CONDENSATES OF POLY-ALKOXY SILOXANES WITH UNSATURATED POLYESTERS MODIFIED WITH LIPOPHILIC MONOMER
Kazys Sekmakas, Chicago, Ill., assignor to De Soto, Inc., Chicago, Ill., a corporation of Delaware
No Drawing. Continuation-in-part of application Ser. No. 519,524, Jan. 10, 1966. This application Sept. 20, 1966, Ser. No. 580,573
Int. Cl. C08g 31/06
U.S. Cl. 260—827       21 Claims

ABSTRACT OF THE DISCLOSURE

Thermosetting coatings are provided based on heat-hardening derivatives of unsaturated poyesters. To this end, the unsaturated polyester is copolymerized with from 1–10%, based on total weight, of a lipophilic monomer such as stearyl or lauryl acrylate and the so-modified polyester is then condensed with a polyalkoxy siloxane to provide a composite resin capable of curing rapidly and which exhibits good flow and wetting properties.

---

The present invention is a continuation-in-part of my prior copending application Ser. No. 519,524, filed Jan. 10, 1966.

The present invention relates to organic solvent-soluble, heat-hardening, nongelled resins produced from unsaturated polyester resins and silicone resins.

The new resins of the invention are particularly useful in organic solvent solution coating compositions which cure at elevated temperature to provide thermoset coatings having greatly enhanced resistance to long term exterior exposure.

In general, organo-silicone resinous materials of many types are known, but these are generally slow curing and cured films produced from the same lack desirable physical characteristics, especially from the standpoint of film flexibility, toughness and impact resistance. It is especially desirable to incorporate large proportions of the silicone resin into the organic resin including the same, the degree of durability achieved being generally proportional to the amount of silicone resin which is incorporated. Unfortunately, as the proportion of silicone resin is increased, the curing rate of the organic polymer becomes less satisfactory and the films tend to be brittle and therefore of only limited utility.

When saturated polyester resins are combined with silicone resins, the composite resin tends to exhibit poor plate wetting properties, cratering tendencies are observed and the flow characteristics are poor. The use of unsaturated polyesters in place of saturated polyesters does not help this situation for unsaturated polyesters are notoriously poor in their plate wetting, cratering, and flow properties, the very areas in which the combination of silicone resin and saturated polyesters is inadequate.

In accordance with the present invention, an unsaturated polyester resin is selected and copolymerized with a small proportion of a lipophilic monomer, such as stearyl or lauryl acrylate, to provide a modified polyester resin which is then combined with a polyalkoxy siloxane resin in order to provide organo-silicone resinous materials which are rapid curing and which form films possessing superior durability combined with good physical characteristics and which, moreover, exhibit good plate wetting properties, resistance to cratering and which flow out well to provide a smooth and uniform surface.

In my prior application Ser. No. 519,524, filed Jan. 10, 1966, unsaturated polyester resins are combined with polyalkoxy siloxanes and copolymerization is used to provide superior properties. In this disclosure, much larger proportions of vinyl monomers are proposed in order to provide superior product properties, the vinyl monomer being copolymerized with the ether formed by prereacting the hydroxy-functional polyester and the polyalkoxy siloxane. In contrast, and in the present invention, the polyester is preferably first modified by reaction with the desired small proportion of lipophilic vinyl monomer.

The lipophilic monomers which may be used in the invention may be constituted by any monoethylenically unsaturated monomer having a lipophilic terminal group, e.g., a hydrocarbon chain containing at least 4 carbon atoms. In addition to stearyl and lauryl acrylate noted hereinbefore, one can use the corresponding methacrylate. Butyl methacrylate is useful even though it is of minimal chain length and is a desirable agent to select because of its lower cost, but 2-ethyl hexyl acrylate is viewed as superior, and it is also of modest cost and readily available. Dibutyl maleate or fumarate may also be used, but monomers containing the $CH_2=C<$ group are preferred. As can be seen, alcohol esters of monoethylenic monocarboxylic acids are preferred especially acrylic acid, methacrylic acid and crotonic acid. Alcohols containing at least 6 carbon atoms are preferred.

The proportion of lipophilic monomer in the invention should range from 1–10%, based on the total weight of the final completed resin, including both the hydroxy-functional polyester component and the siloxane component. Preferred proportions on the same basis are from 2–10%, most preferably from 3–8%. The purpose is to obtain a sufficient modification in the wetting, cratering and flow characteristics in order to provide a workable system while, at the same time, effecting such modification with only a minor portion of the more expensive long chain vinyl monomer.

Numerous ethylenically unsaturated polyesters may be employed after they have been modified by copolymerization with a small proportion of lipophilic monomer in accordance with the invention, it being understood that these polyesters are polyethylenically unsaturated and not monoethylenically unsaturated.

The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used, such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization. Incorporation of monocarboxylic acids is facilitated by the use of glycerine in the production of the polyester. When the glycerine polyester is performed, the monoacid reacts with the secondary hydroxyl group of the glycerine residue, but, as is known, the polybasic acid, the glycerine, and the mono-acid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha, beta-unsaturation, (2) beta-gamma unsaturation, or (3) conjugated unsaturation.

Broadly, the unsaturated polyester resin should contain about 0.005 to 0.40 gram mol of ethyleniclly unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or more vigorous conditions. With more unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably and when using polyester containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.02–0.3 gram mol of unsaturated component per 100 grams of polyester.

The polyester resins used in the invention are hydroxy functional materials and are preferably highly branched for superior solvent solubility. Thus, the components which are polyesterified should include at least 1.5 equivalents of hydroxy functionality per equivalent of carboxy functionality. Preferably, the ratio of hydroxy to carboxy is at least 2.0:1 and at least 50% of the hydroxy-functional materials used should contain at least three hydroxy groups per molecule, these being illustrated by glycerin, trimethylol propane, pentaerythritol, and the like. Glycols such as ethylene glycol, propylene glycol, butylene glycol, diethylene glycol, and the like, may be present. Dicarboxylic acids such as any of the phthalic acids or the anhydride of ortho phthalic acid are normally used to form the polyester, but aliphatic acids such as adipic acid and succinic acid are also useful as are unsaturated acids such as maleic acid and fumaric acid. Tribasic acids such as trimellitic anhydride and tetrabasic acids such as mellitic dianhydride may be used, but are preferably absent or their proportion minimized to minimize the tendency toward gelation.

While the polyester may include an oil component the polyesters of the invention are preferably oil-free.

While the unsaturated polyester resins which are used in the invention are hydroxy-functional resins, this does not preclude the presence of some small residual acid functionality.

While the molecular weight of the unsaturated polyester is of secondary significance so long as the polyester is not gelled, it is desirable to employ polyesters which have a viscosity in a n-butanol at 80% solids in the range of from C to Z–6, preferably in the range of from V to Z–2 measured on the Gardner-Holdt scale at 25° C.

The unsaturated polyester and lipophilic monomer are desirably prereacted, before etherification with the siloxane resin, in the presence of an appropriate polymerization catalyst. Any free-radical generating polymerization catalyst may be used and the copolymerization should be carried out in organic solvent solution in accordance with the invention. The selection of catalyst is determined by the desired temperature for the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

Normally, the reaction between a vinyl monomer and an unsaturated polyester resin is a cross-linking reaction which thermosets the polyester, but this is not the desired result in the practice of this invention. The small proportion of vinyl monomer with its long hydrocarbon chain that is used herein does not tend to thermoset the polyester resin but merely modifies its characteristics to provide the wetting and flow characteristics which are desired.

The presence of the polyalkoxy siloxane resin in accordance with the invention is beneficial within a very large range of proportions. Broadly, the siloxane is incorporated in an amount of from 15–50% by weight, based on the total weight of the final resin. Preferably, proportions are from 20–45% on the same basis, typical products being illustrated by 30%. The maintenance of compatibility, rapid cure and the achievement of films possessing good properties as the proportion of silicone resin increases above 20% represents a surprising and most valuable discovery.

It is to be observed that the proportions used are based upon the entire siloxane resin prior to etherification. This is because the silicon-oxygen bond as well as the silicon-hydrocarbon bond is very resistant to degradation so that from 80–90% of the siloxane compound used may be viewed as accounting for the improved durability which is achieved.

The ratio of polymethoxy siloxane to modified unsaturated polyester can vary considerably and can be expressed on an equivalent basis comparing methoxy functionality in the siloxane with hydroxy functionality in the modified polyester. On this basis, the ratio may vary from 1:1.5 to 1:5, preferably from 1:1.8 to 1:4. Most preferably, hydroxy functionality is in substantial excess of at least 2:1.

The extent of reaction can also very widely, e.g., at least 10%, based on methoxy, but preferably higher so long as gelation is avoided. In the preferred situation, the methoxy group is reacted to an extent of from 25% to 75%, the hydroxy being in substantial excess as has been stated.

Completion of the siloxane etherification to the extent desired can be accurately determined by the elimination of methanol given off during the reaction. The etherification reaction is generally carried out at a temperature ranging from 200–350° F. The reaction may be carried out under a reduced pressure in order to speed the removal of the volatile product of the etherification, but this is not essential.

It is to be noted that excessive etherification leads to gelation. In the most aggravated situation, gelation takes place at the elevated etherification temperature. In less severe situations, gelation or partial gelation occurs when the product is cooled. This is a typical situation in the production of any resin which is desirably advanced as far as possible without causing the product to gel, and experience should be used to gauge the maximum extent to which the etherification can be advanced without causing gelation.

It is desired to stress that the presence of the alkoxy group is important to the achievement of satisfactory resins in the absence of gelation. When the alkoxy group is presented as required by the invention, the condensation reaction leads to the release of alcohol which can be effected at a low temperature enabling the resin to be advanced to a point from which it can be cured rapidly and without causing the advancing resin to lose solvent solubility as it is prepared, which would be evidenced by gelation or by the production of insoluble resin particles which would have to be removed as by filtration.

It is to be noted that the methoxy group is referred to herein as a matter of convenience and this is the group which is preferably used. However, and within the broadest purview of the invention, any lower alkoxy group may be utilized, the term "lower" identifying the presence of from 1–4 carbon atoms.

Broadly, any polymethoxy silane may be used in accordance with the invention, these being of two types:

$$RSiX_3$$

or $$R_2SiX_2$$

in which X identifies the alkoxy or more preferably the methoxy group. It is particularly preferred to employ polymethoxy siloxanes which have the structural unit:

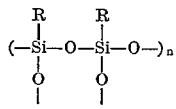

in which $n$ denotes the average number of recurring groups in the resinous molecule.

The preferred hydrocarbon-substituted polysiloxanes are illustrated by dimethyl triphenyl trimethoxy trisiloxane or hydrolysates of the same which contain from 5–20% by weight of the methoxy group. The base compound can be referred to as having the following average chemical formula:

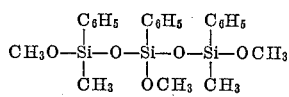

In practice, a compound of the above formula is available with an average molecular weight of 470, a combining weight of 155 and a methoxy content of 20% by weight. This product has a viscosity at 77° F. of 13 centistokes (A–3 on the Gardner-Holdt scale).

Another appropriate product is obtained by hydrolysing the above described trisiloxane to reduce its methoxy content to 15% by weight, which increases its molecular weight until the viscosity at 77° F. is from 60–120 centistokes (B to E on the Gardner-Holdt scale). This product is referred to in the examples which follow as siloxane resin A.

The amount of water used in the hydrolysis can be varied to adjust the final methoxy content and appropriate products can be formulated to include a final methoxy content of from 10–20% by weight, corresponding to a molecular weight of from 470 to somewhat over 2,000. Especially preferred is a compound having the formula:

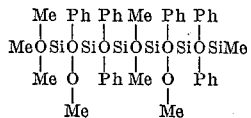

in which Ph identifies the phenyl group and Me the methyl group. This structure contains a plurality of methoxy groups per molecule and has a weight percent methoxy of 13.9%.

In the invention, the silicon-containing component is incorporated by a reaction between hydroxy groups and methoxy groups which splits off methanol under conditions in which methoxy groups are not able to react with themselves so that polymerization of the silicon-containing component by condensation is avoided to a greater extent than would be the case if the silicon-containing component were combined into the unsaturated polyester resin by condensation of hydroxy groups. As a result, a greater proportion of silicon-containing component can be incorporated without difficulty in the present invention.

It is first desired to point out that the curing reaction is between the silicon carried methoxy groups and hydroxy or methylol groups carried elsewhere in the interpolymer. Such reactions are much faster than the self-condensation of methoxy groups which is the mechanism through which the methoxy siloxane cures in the absence of the present invention. For this reason, the products of the invention cure at much lower temperatures to provide a highly cross-linked, three-dimensional structure.

While the siloxane-containing interpolymers are importantly useful alone in organic solvent solution coating compositions, they also exhibit excellent compatibility with other film forming resinous materials, and are desirably applied in admixture therewith. The term "admixture" includes partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins which function to enhance curing capacity when the interpolymers of the invention are deficient in this respect. The aminoplast resin is utilized in an amount of from 5–50% by weight, based on the total weight of resin. Excellent compatibility is also exhibited with alkyd, epoxy, and vinyl resins.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with other resins, from a compatible organic solvent solution. These coating solutions may be pigmented or contain dyes, flow control agents, waxes and various other components as will be evident to those skilled in the art.

EXAMPLE I

Preparation of hydroxy-terminated unsaturated polyester

| | Parts by weight |
|---|---|
| Trimethylol propane | 2700 |
| Isophthalic acid | 940 |
| Xylol | 30 |
| 2-ethoxy ethanol acetate | 30 |

Charge in reactor equipped with agitator, thermometer, Dean-Stark trap, nitrogen inlet tube, and a reflux condenser. Heat to 430° F. and hold for an acid value of 65–75.

| | Parts by weight |
|---|---|
| Adipic acid | 730 |
| Isophthalic acid | 600 |
| Maleic anhydride | 60 |
| 2-ethoxy ethanol acetate | 20 |

Reheat to 420° F. and hold for an acid value of 10–12.

| | Parts by weight |
|---|---|
| 2-ethoxy ethanol acetate | 2700 |

Add to 60% solids.

Final characteristics

| | |
|---|---|
| Viscosity (Gardner) | U–V. |
| Viscosity | 8.0 poises. |
| Hydroxyl value | 38.1. |
| Hydroxy equivalence | .68 per 100 grams of resins solids. |

In the above polyester, the components are chosen to provide a ratio of hydroxy functionality to carboxy functionality of 2.1:1.0. The degree of unsaturation, which is provided by highly reactive maleic anhydride, is .012 mole per 100 grams of resins solids.

EXAMPLE II

Preparation of siloxane-polyester resin

| Composition: | Percent |
|---|---|
| Siloxane resin A | 35 |
| Polyester of Example I (60% resin solids solution) | 65 |

Procedure of preparation

| | Parts by weight |
|---|---|
| Hydroxy terminated unsaturated polyester of Example I | 960 |
| Siloxane resin A containing 15% methoxy groups (1.5 equivalents) | 312 |
| Tetrabutyl titanate | 1.2 |
| 2-ethoxy ethanol acetate | 312 |

Charge into a reactor equipped with stirrer, reflux condenser, nitrogen inlet tube, and Dean-Stark trap. Heat to 270° F. and distill off 32 grams of methanol.

Final characteristics

| | |
|---|---|
| Degree of condensation __percent__ | 66 |
| Viscosity (Gardner) | T |
| Color (Gardner) | 1–2 |
| Solids __percent__ | 55.5 |

In this example, the ratio of hydroxy functionality in the polyester to methoxy functionality in the siloxane is 2.6:1.

The resin of Example II exhibited cratering tendencies, and showed poor wetting properties over grease, lanolin, marking ink, and crayon.

The following example embodies a resin modified in accordance with the present invention and which exhibits outstandingly superior flow, wet inking, and coverage of greasy or oily metal surfaces.

EXAMPLE III

Preparation of a lipophilic-monomer-modified polyester resin-siloxane resin

| Composition: | Percent |
|---|---|
| Polyester of Example I (60% resin solids solution) | 65.4 |
| Siloxane resin A | 30 |
| 2-ethylhexyl acrylate | 4.5 |

Procedure of Preparation

| | Parts by weight |
|---|---|
| 2-ethylhexyl acrylate | 50 |
| 2-ethoxy ethanol acetate | 370 |

Charge into a reactor equipped with an agitator, thermometer, nitrogen inlet tube and reflux condenser. Heat to 240° F.

| | Percent by weight |
|---|---|
| Hydroxy terminated unsaturated polyester of Example I | 1167 |
| Cumene-hydro-peroxide | 15 |

Premix and add over two hours period at 240° F. Hold for two hours at 240–250° F.

| | Percent by weight |
|---|---|
| Siloxane Resin A having 15% methoxy groups (1.54 equivalents) | 320 |
| Tetrabutyl titanate | 1 |

Add. Heat to 270° F. and distill off 32.8 grams of methanol. Hold for viscosity U–V.

| | Percent by weight |
|---|---|
| Butanol | 30 |

Add. Filter.

Final characteristics

| | |
|---|---|
| Degree of condensation __percent__ | 66 |
| Viscosity (Gardner) | T |
| Color (Gardner) | 1–2 |
| Solids __percent__ | 56.4 |

The ratio of hydroxy functionality in the polyester to methoxy functionality in the siloxane in this example is 3.1:1.

The resin of Example III was applied to an aluminum panel that had been streaked with marking ink and a thin film of lanolin. The modified silicone-polyester resin exhibited excellent flow and outstanding wetting properties over grease-lanolin covered surfaces.

The following two examples show the results of a controlled comparison of the unmodified siloxane-polyester resin with an identical siloxane-polyester resin that had been modified by the copolymerization of a lipophilic monomer.

EXAMPLE IV

Preparation of a siloxane-polyester resin

| Composition: | Percent |
|---|---|
| Unsaturated polyester resin of Example I | 70 |
| Siloxane resin A | 30 |

Procedure for preparation

| | Parts by weight |
|---|---|
| Hydroxy terminated polyester of Example I | 1150 |
| 2-ethoxy ethanol acetate | 370 |

Charge into a reactor equipped with an agitator, reflux condenser, thermometer, and nitrogen inlet tube. Heat to 240–250° F. using light nitrogen blanket. Hold for two hours.

| | Parts by weight |
|---|---|
| Siloxane resin A (1.54 equivalents) | 320 |
| Tetrabutyl titanate | 1 |
| 2-ethoxy ethanol acetate | 48 |

Add premixed to the flask. Set empty Dean-Stark trap and switch to nitrogen sparge. Heat to 265–275° F. and distill off 34–35 grams of methanol. Hold for viscosity W–X.

| | Parts by weight |
|---|---|
| Butanol | 60 |

Add and adjust viscosity.

Final characteristics

| | |
|---|---|
| Degree of Condensation __percent__ | 68.5 |
| Viscosity (Gardner) | T–U |
| Color (Gardner) | 1–2 |
| Solids __percent__ | 55.8 |

The ratio of hydroxy functionality in the polyester to methoxy functionality in the siloxane of this example is 3.0:1.0.

EXAMPLE V

Preparation of a lipophilic-monomer-modified siloxane polyester resin

| Composition: | Percent |
|---|---|
| Unsaturated polyester of Example I | 65 |
| Siloxane resin A | 30 |
| Butyl methacrylate | 5 |

Procedure for preparation

| | Parts by weight |
|---|---|
| Hydroxy terminated unsaturated polyester of Example I | 1150 |
| Butyl methacrylate | 53 |
| Cumene-hydro-peroxide | 15 |
| 2-ethoxy ethanol acetate | 370 |

Charge into a reactor equipped with an agitator, reflux condenser, thermometer and nitrogen inlet tube. Heat to 240–250° F. using a light nitrogen blanket. Hold for two hours.

| | Parts by weight |
|---|---|
| Siloxane resin A (1.54 equivalents) | 320 |
| Tetrabutyl titanate | 1 |
| 2-ethoxy ethanol acetate | 48 |

Add premixed to the flask. Set empty Dean-Stark trap and switch to nitrogen sparge. Heat to 265–275° F. and distill off 34–35 grams of methanol. Hold for viscosity of W–X.

|  | Parts by weight |
|---|---|
| Butanol | 60 |

Add and adjust viscosity.

Final characteristics

| | |
|---|---|
| Degree of Condensation _____percent\_\_ | 68.5 |
| Viscosity (Gardner) _____ | U–V |
| Color (Gardner) _____ | 1–2 |
| Solids _____percent\_\_ | 52.5 |

This resin had a hydroxy functionality in the polyester to methoxy functionality in the siloxane in the ratio of 3.0:1.0.

The resins of Example IV and Example V were applied over aluminum panels containing a thin film of lanolin and marking ink. The films were baked for 90 seconds at 475° F. The resin of Example V exhibited excellent flow and wetting properties over grease and ink covered areas. The resin of Example IV had craters and exhibited crawling and poor grease covering properties.

EXAMPLE VI

Preparation of gloss enamel

A high gloss enamel containing the interpolymer of Example III is prepared using the following composition:

|  | Parts (solids basis) |
|---|---|
| Titanium dioxide _____percent\_\_ | 28 |
| Resin of Example III _____ | 32 |

The enamel is drawn down on chromate-treated aluminum panels with a No. 38 wound wire rod and baked for 90 seconds at 475° F.

The following results are obtained:

| | |
|---|---|
| Gloss (photovolt 60° reading) | 90. |
| Flow | Very good. |
| Mar resistance | Very good. |
| Pencil hardness | H. |
| Reverse impact | Pass 30 in./lbs. |
| Acetone resistance | Pass 50 rubs. |
| Adhesion to metal | Excellent. |

As the above results demonstrate, the coatings prepared with siloxane-modified unsaturated polyester resin of the invention exhibit good flexibility, impact, adhesion and curing properties.

Blends with aminoplastic resin are particularly desirable because lower curing temperatures can be used and harder films are obtained. These blends are illustrated by mixing 95 parts of the resin solution of Example V with 5 parts of hexamethoxymethyl melamine until uniformly distributed. A film draw down of this blend cures well at 425° F. (90 seconds) and the films are harder than are obtained even when the unmodified resin solution is cured at 475° F.

The invention is defined in the claims which follow.

I claim:
1. Organic solvent-soluble, nongelled, heat-hardenable organo-silicone resinous material produced by condensing:
  (a) hydrocarbon-substituted polyisoloxane having a plurality of silicon-bonded alkoxy groups in which the alkoxy groups contain from 1–4 carbon atoms; with
  (b) an hydroxy-functional unsaturated polyester resin produced by the polyesterification of components which contain at least 1.5 equivalents of hydroxy functionality per equivalent of carboxy functionality; said siloxane and said polyester being combined in an equivalent ratio of alkoxy functionality in the siloxane to hydroxy functionality in the modified polyester of from 1:1.5 to 1:5, and said components (a) and (b) being reacted together to consume from 10–90% of the alkoxy groups in said siloxane, said polyester being modified by copolymerization with from 1–10% by weight, based on the total weight of the organo-silicone resinous material, of monoethylenically unsaturated monomer consisting essentially of lipophilic alkyl esters of mono- or dicarboxylic acids in which the alkyl group contains at least 4 carbon atoms.

2. Organo-silicone resinous material as recited in claim 1 in which the alkoxy group of said siloxane is a methoxy group.

3. Organo-silicone resinous material as recited in claim 1 in which the equivalent ratio of alkoxy groups in said component (a) to hydroxy groups in said component (b) is in the range of 1:1.8 to 1:4.

4. Organo-silicone resinous material as recited in claim 1 in which said siloxane is present in an amount of from 15–50% by weight, based on the total weight of the organo-silicone resinous material.

5. Organo-silicone resinous material as recited in claim 1 in which from 25–75% of the alkoxy content of said component (a) is consumed.

6. Organo-silicone resinous material as recited in claim 1 in which the equivalent ratio of alkoxy groups in said component (a) to hydroxy groups in said component (b) is at least 1:2 and said alkoxy group is the methoxy group.

7. Organo-silicone resinous material as recited in claim 1 in which said siloxane contains from 5–20% by weight of the methoxy group.

8. Organo-silicone resinous material as recited in claim 1 in which the unsaturation of said polyester resin is selected from the group consisting of (1) alpha,beta-unsaturation; (2) beta-gamma-unsaturation; and (3) conjugated unsaturation.

9. Organo-silicone resinous material as recited in claim 8 in which said unsaturated polyester resin contains about 0.005 to 0.40 gram mol of ethylenically unsaturated component per 100 grams of polyester.

10. Organo-silicone resinous material as recited in claim 9 in which said unsaturated polyester resin has a viscosity in n-butanol at 80% solids in the range of from C to Z–6 on the Gardner-Holdt scale at 25° C.

11. Organo-silicone resinous material as recited in claim 1 in which at least 50% of the hydroxy-functional material used in the preparation of said unsaturated polyester resin contains at least three hydroxy groups per molecule.

12. Organo-silicone resinous material as recited in claim 11 in which the polycarboxylic acid components of said polyester consist essentially of dicarboxylic acids.

13. Organo-silicone resinous material as recited in claim 1 in which the proportion of said monomer is in the range of from 3–8% by weight, based on the total weight of the organo-silicone resinous material.

14. Organo-silicone resinous material as recited in claim 1 in which said monomer is an alcohol ester of a monoethylenically unsaturated monocarboxylic acid.

15. Organo-silicone resinous material as recited in claim 14 in which said monocarboxylic acid is from the group of acrylic acid, methacrylic acid and crotonic acid.

16. Organo-silicone resinous material as recited in claim 14 in which said alcohol contains at least 6 carbon atoms.

17. An organic solvent solution thermosetting coating composition comprising organic solvent having dissolved therein the resin defined in claim 1.

18. Organic solvent-soluble, nongelled, heat-hardenable organo-silicone resinous material produced by condensing:
  (a) polyalkoxy siloxane in which the substituents carried by the silicon atoms consist essentially of alkoxy, alkyl, and aryl radicals and in which there are a plurality of silicon-bonded alkoxy groups which contain from 1–4 carbon atoms; with
  (b) an hydroxy-functional unsaturated polyester resin produced by the polyesterification of components which contain at least 1.5 equivalents of hydroxy functionality per equivalent of carboxy functionality with at least 50% of the hydroxy-functional components containing at least three hydroxyl groups per molecule, said polyester being modified by copolymerization with from 3-8% by weight, based on the total weight of the organo-silicone resinous material, of lipophilic monoethylenically unsaturated ester of monoethylenic monocarboxylic acid with alcohol containing a terminal hydrocarbon chain of at least 6 carbon atoms;

said polyalkoxy siloxane and said polyester being combined in an equivalent ratio of alkoxy functionality in the siloxane to hydroxy functionality in the modified polyester of from 1:1.8 to 1:4, and said components (a) and (b) being reacted together to consume from 25-75% of the alkoxy groups in said siloxane.

19. Organo-silicone resinous material as recited in claim 18 in which said siloxane is a polymethoxy siloxane containing from 5-20% by weight of the methoxy group and present in an amount of from 15-50% by weight, based on the total weight of the organo-silicone resinous material and said unsaturated polyester contains about 0.005 to 0.40 gram mol of ethylenically unsaturated component per 100 grams of polyester.

20. An organic solvent solution thermosetting coating composition comprising organic solvent having dissolved therein the resin defined in claim 1 in admixture with heat-hardening, solvent-soluble aminoplast resin.

21. Organo-silicone resinous material as recited in claim 1 in which said unsaturated polyester resin is oil-free.

References Cited
UNITED STATES PATENTS 3,318,971   5/1967   Chloupek et al. _____ 260—826

MURRAY TILLMAN, *Primary Examiner.*

PAUL LIEBERMAN, *Assistant Examiner.*

U.S. Cl. X.R.

117—132; 260—826, 31.4, 33.4, 39, 41

UNITED STATES PATENT OFFICE
CERTIFICATE OF CORRECTION

Patent No. 3,450,792                         June 17, 1969

Kazys Sekmakas

It is certified that error appears in the above identified patent and that said Letters Patent are hereby corrected as shown below:

Column 2, line 66, "performed" should read -- preformed --. Column 7, lines 47, 53 and 59, "Percent by weight", each occurrence should read -- Parts by weight --. Column 9, line 63, "polyisoloxane" should read -- polysiloxane --.

Signed and sealed this 24th day of March 1970.

(SEAL)
Attest:

Edward M. Fletcher, Jr.                    WILLIAM E. SCHUYLER, JR.
Attesting Officer                             Commissioner of Patents